United States Patent
Williams, III

[11] Patent Number: 5,855,225
[45] Date of Patent: Jan. 5, 1999

[54] TANK TRANSPORT PRESSURE RELIEF VALVE ASSEMBLY

[76] Inventor: James W. Williams, III, P.O. Box 336 - 1204 Meetinghouse Rd, Apartment S9, Gwynedd, Pa. 19436

[21] Appl. No.: 15,006

[22] Filed: Jan. 29, 1998

[51] Int. Cl.⁶ .................................................. F16K 15/00
[52] U.S. Cl. ......................... 137/535; 137/536; 137/529; 251/337
[58] Field of Search .................. 137/535–536, 137/537, 529; 251/337, 336

[56] References Cited

U.S. PATENT DOCUMENTS

| | | | |
|---|---|---|---|
| 72,192 | 12/1867 | Green | 137/535 |
| 205,566 | 7/1878 | Miller | 137/535 |
| 711,792 | 10/1902 | Smith | 137/535 |
| 1,180,379 | 4/1916 | Dayton | 137/535 |
| 2,063,047 | 12/1936 | Noble | 137/535 |
| 2,264,136 | 11/1941 | Karlberg | 137/535 |
| 2,293,956 | 8/1942 | Walthers | 251/337 |
| 2,299,654 | 10/1942 | Ray | 251/337 |
| 2,525,487 | 10/1950 | Johnson | 137/535 |
| 2,679,860 | 6/1954 | Diebold | 137/535 |
| 3,300,137 | 1/1967 | Murphy | 251/337 |
| 3,447,565 | 6/1969 | Davis, Jr. | |
| 3,895,647 | 7/1975 | Willenbrock et al. | 137/535 |
| 3,974,850 | 8/1976 | Pierson | |
| 4,298,023 | 11/1981 | McGinnis | 137/535 |
| 4,357,954 | 11/1982 | Hunter | 137/535 |
| 4,413,688 | 11/1983 | Seabourn | 137/535 |
| 4,709,901 | 12/1987 | Pierson et al. | |
| 4,856,547 | 8/1989 | Solaroli | |
| 5,411,056 | 5/1995 | Solaroli | |

FOREIGN PATENT DOCUMENTS

| | | | |
|---|---|---|---|
| 606816 | 11/1925 | France | 137/535 |
| 2436345 | 2/1976 | Germany | 137/535 |

*Primary Examiner*—Denise L. Ferensic
*Assistant Examiner*—Joanne Y. Kim
*Attorney, Agent, or Firm*—Howson and Howson

[57] ABSTRACT

A pressure relief valve for releasing fluid through a vent in a railway tank car, tank trucks and similar vessels. A valve disk is normally biased in a closed position by a plurality of constant-force springs of laminated steel tapes on drums supported on upright angle brackets symmetrically arranged around a valve seat. The pressure at which the valve opens is determined by a preselection of the number of springs, laminated tapes per spring, and the restoring force of each tape.

8 Claims, 2 Drawing Sheets

TANK TRANSPORT PRESSURE RELIEF VALVE ASSEMBLY

FIELD OF THE INVENTION

The present invention relates generally to pressure relief valves, and more particularly to a pressure relief valve for venting expanding fluids contained in railway tank cars, tank trucks and similar containers.

BACKGROUND OF THE INVENTION

Certain liquids and gases transported in railway tank cars or tank trucks are particularly hazardous and at elevated temperatures may expand within the tank and increase the internal pressure to a dangerous level. Government regulatory agencies therefore require operators of these vehicles to install safety pressure relief valves which are set to open automatically above a specified pressure level and vent at a specified rate of discharge.

Presently employed pressure relief valves are generally biased to the closed position such as by a coil spring or a constant-force spring. Coil spring valves usually require the pressure in the tank to continue to increase beyond the initial opening pressure in order to reach the maximum venting capacity. The constant-force spring valves, on the other hand, have the advantage of opening to a maximum venting capacity instantly at the initial opening pressure without any further increase in pressure. Notwithstanding this advantage, size, complexity and cost of the constant-force spring valve have mitigated their general acceptance in the industry. Space restrictions and design constraints also limit the number of springs to only a few making the valve more difficult to "tune" for a precise initial opening pressure, or to maintain the valve element aligned with the valve seat for positive closure.

SUMMARY OF THE INVENTION

Accordingly, it is an object of the present invention to provide a high capacity, constant-force spring pressure relief valve suitable for use in tank cars, tank trucks and similar containers which will release fluids at a high venting rate above a precise preset pressure.

Another object is to provide a constant-force spring pressure relief valve which is reliable, compact and relatively simple in construction and operation.

Still another object is to provide a constant-force spring pressure relief valve in which the valve element is maintained in constant alignment with the valve seat for maintaining positive shutoff below a preset pressure.

A further object of the invention is to provide a pressure relief valve which is capable of being precisely set for venting a container above a predetermined initial pressure.

These and other objects and advantages of the invention are accomplished by a pressure relief valve assembly comprising a valve body with a valve seat around an aperture suitable for mounting in communication with a vent opening of a fluid storage tank. A valve disk is normally biased in a closed position on the valve seat by constant-force springs of laminated steel tapes wound on spools and rotatably supported between upright angle brackets disposed around the valve seat. The valve disk moves against the force of the springs to a fully open position if fluid in the tank exceeds a predetermined pressure. The brackets are fixed to the valve body in close proximity to the valve disk for maintaining the valve disk in coaxial alignment with the valve seat. The number of springs and laminated tapes per spring, and the restoring force of each tape are selected to meet the required valve opening pressure. Deflectors secured to the valve body between the brackets below the springs shield the valve assembly from exposure to vented fluids.

BRIEF DESCRIPTION OF THE DRAWINGS

The foregoing and other objects, novel features and advantages of the invention will become more apparent from the following description when taken in conjunction with the accompanying drawings wherein.

DESCRIPTION OF THE PREFERRED EMBODIMENT

Figure 1:
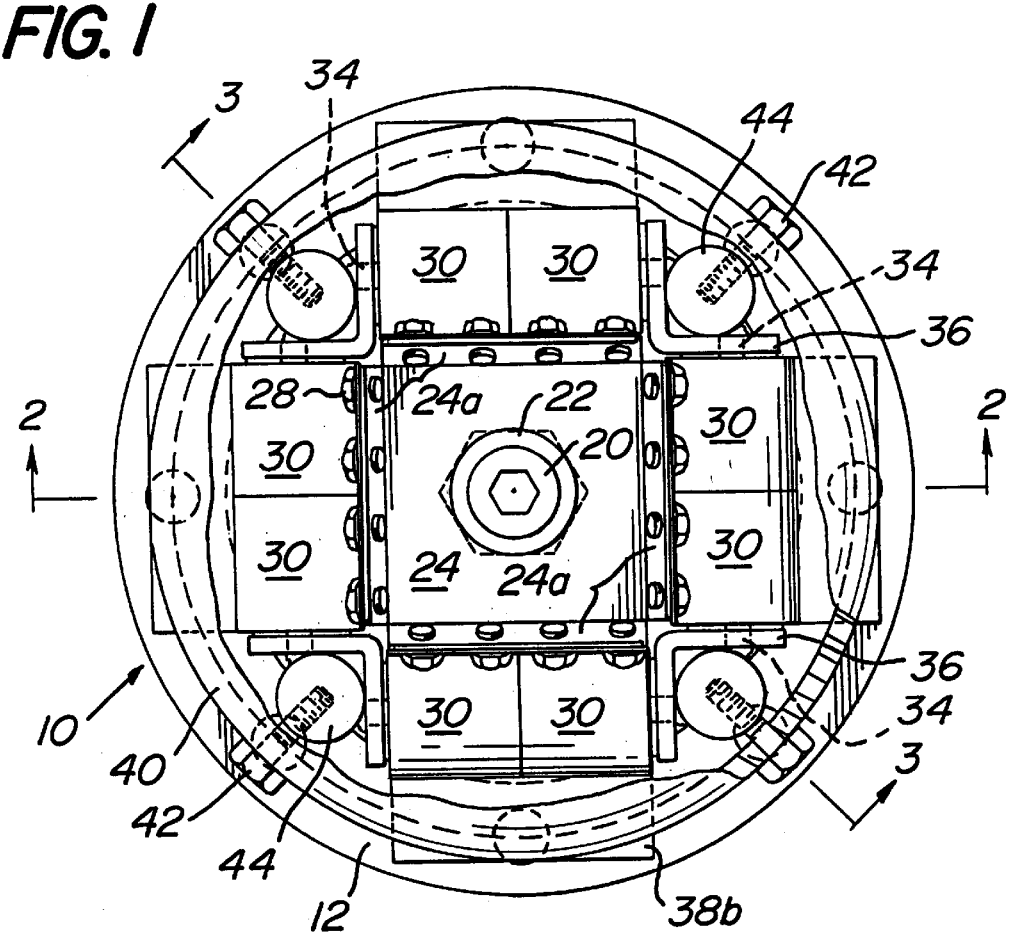
FIG. 1 is a plan view of a pressure relief valve according to the invention with a protective dome of the valve partly cut away.
Figure 2:
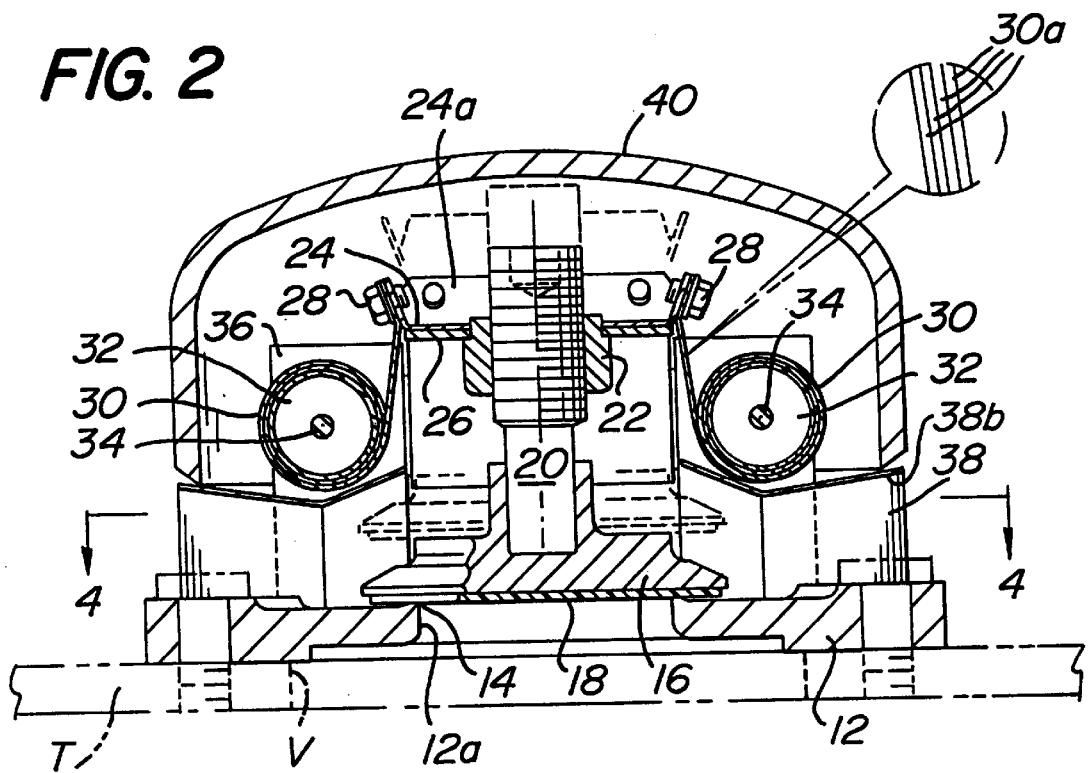
FIG. 2 is a view in cross section of the pressure relief valve taken in a vertical plane along the line 2—2 of FIG. 1 with a magnified edge-wise view of a constantforce spring employed in the valve.
Figure 3:
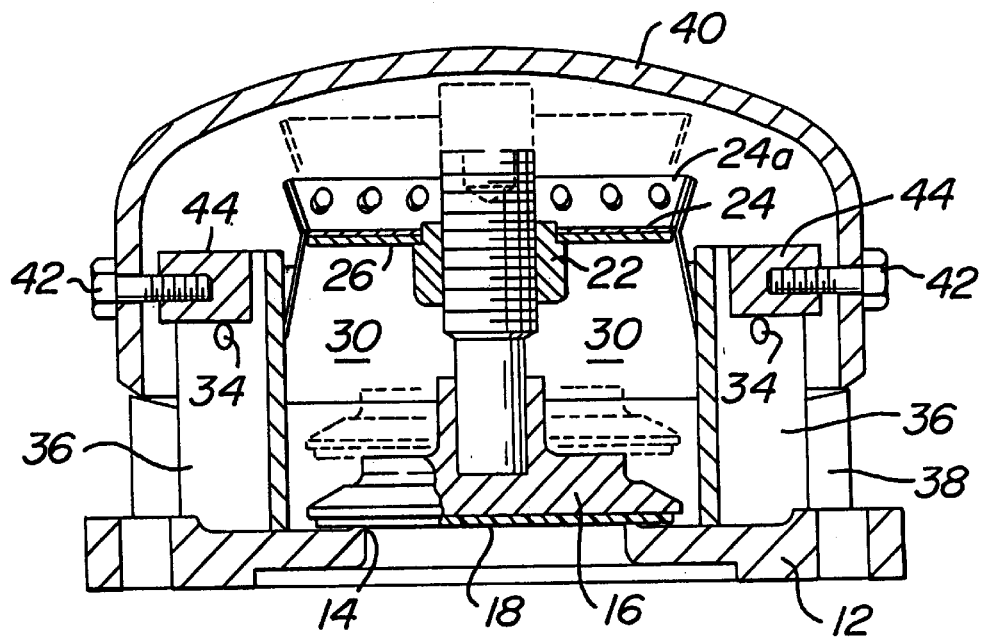
FIG. 3 is a view in cross section of the pressure relief valve taken in a vertical plane along line 3—3 of FIG. 1.

Referring now to the drawings wherein like reference numerals and characters designate like or corresponding parts throughout the several views, there is illustrated a pressure relief valve assembly 10, in a normally closed position, suitable for mounting on a fluid storage tank T (shown in phantom outline in FIG. 2).

Valve assembly 10 includes a valve body 12 with a valve seat 14 around a circular aperture 12a which communicates through a vent opening V (FIG. 2) with the interior of the tank, and a circular disk 16 coaxially aligned with and moveable relative to aperture 12a. Valve seat 14 defines an annular lip around the upper edge of aperture 12a which sealingly engages a resilient pad 18 of rubber or similar material bonded to a flat surface of disk 16. A valve stem 20 extends coaxially upward from disk 16 to threadingly engage a nut 22 fixed at the center of a square plate 24 and a reinforcing member 26 contiguous therewith. Plate 24 is disposed in a plane normal to the length of stem 20 and includes flange 24a extending generally upward from its four edges.

Each flange 24a is connected by fasteners 28 at the distal ends of a pair of constant-force springs 30 of laminated steel tapes 30a (see magnified view in FIG. 2). The tapes are wound on drums 32 which are independently rotatable on a common spindle 34 to provide a constant restoring force regardless of the displacement of plate 24 relative to spindle 34.

Figure 4:
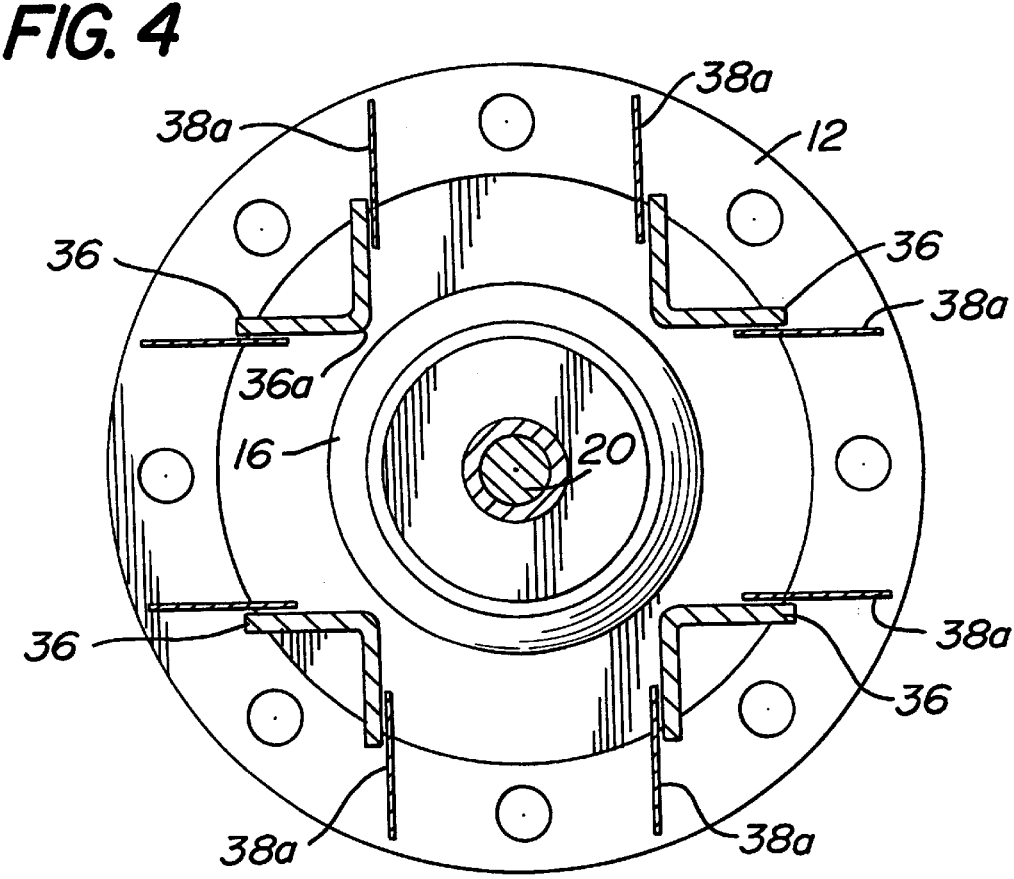
FIG. 4 is a view in cross section of the pressure relief valve taken in a horizontal plane along the line 4—4 of FIG. 2.

Upright orthogonal angle brackets 36, fixed respectively to valve body 12 between adjacent pairs of springs 30 have mutually facing sides in which ends of spindle 34 are supported. As best seen in FIG. 4, each bracket 36 defines an inside corner 36a in close proximity to the periphery 16a of valve disk 16 for maintaining coaxial alignment of valve disk 16 with valve seat 14.

Beneath each pair of springs 30 there is a deflecting shield 38 having parallel sides 38a disposed at respective adjacent mutually facing sides of brackets 36 and fixed to valve seat member 12. An upper member 38b spans the tops of side members 38a of shield 38 and extends inwardly for completely deflecting vented fluids outwardly from valve assembly 10.

A protective dome 40 completely covers the spring mechanisms of valve assembly 10. Tightening screws 42 threadingly extend inwardly around the periphery of dome 40 and radially compress cylindrical fittings 44 against the facing orthogonal sides of each angle bracket 36.

The pressure at which valve assembly 10 opens is determined by the combined restoring forces of the four springs 30, which in turn is established by the total number of tapes 30a and their respective restoring forces. By way of example, but not limited to the above-described embodiment, assume the following:

required opening pressure, P is 75 psi;

diameter of valve aperture, d is 3 ⅞ (3.875) inches; (area=11.80 in)

total opening force F=884 lbs.

constant restoring force per tape, f is 28.5 lbs.

The required number of tapes N is:

F/f=884/28.5=31 tapes

The 31 tapes may be substantially evenly distributed among the eight springs 30 with four laminated tapes in each of seven of the springs, and three laminated tapes in the remaining spring 30.

Some of the many advantages and novel features of the invention should now be readily apparent. For example, a high capacity, constant-force spring pressure relief valve is provided for use in tank cars, tank trucks, and similar containers which is capable of releasing fluids at a high venting rate at a precise preset pressure. The valve is relatively simple in construction and operation and occupies relatively little space. The valve disk utilized in the invention is maintained in constant alignment with the valve seat to thusly insure positive shut-off below a preset pressure.

While the foregoing embodiment employs a symmetrical arrangement of four pairs of constant-force springs, each pair operating in parallel on four sides of a square valve actuating plate, other arrangements are contemplated without departing from the fundamental inventive concept as disclosed. For instance, the number of springs and laminations may be varied as well as their symmetry about the valve seat so long as they evenly distribute their restoring forces on the valve disk. The valve may also be employed in many vessel types where excess fluid pressure must be avoided.

It will also be understood, of course, that various other changes in the details, materials, steps and arrangement of parts, which have been herein described and illustrated in order to explain the nature of the invention, may be made by those skilled in the art within the principle and scope of the invention as expressed in the appended claims.

I claim:

1. A valve assembly for releasing fluid through a vent opening in a storage tank above a predetermined pressure comprising in combination:

a valve seat adapted to be mounted on the tank for communicating with the vent opening;

a valve disk reciprocal relative to said valve seat for opening and closing the vent opening;

a plurality of angle brackets fixed uprightly and symmetrically around said valve seat in close proximity to said valve disk, adjacent ones of said brackets having parallel mutually facing sides;

a plate connected to said valve disk movable with said valve disk along the length of said brackets;

at least one constant-force spring means having a proximal end rotatably mounted between each of said facing sides on an axis perpendicular thereto, and a distal end connected to said plate for urging said valve disk to a closed position.

2. A valve assembly according to claim 1 wherein: said spring means includes laminations of spring metal tapes wound on a spool.

3. A valve assembly according to claim 2 wherein:

said spring means includes at least two of said spools independently rotatable on a common spindle supported between said sides of adjacent ones of said angle brackets.

4. A valve assembly according to claim 3 wherein:

said tapes have a uniform restoring force and are distributed substantially equally among respective ones of said spring means.

5. A valve assembly according to claim 4 wherein:

the number of spring means, number of tape per spring and the restoring force of each tape determine the pressure at which said valve disk opens the vent opening.

6. A valve assembly according to claim 1 wherein:

said plate has edges forming a symmetrical polygon; and said distal end of said spring means is connected along respective ones of said edges.

7. A valve assembly according to claim 4 wherein:

said polygon is a square.

8. A valve assembly for relieving pressure from a vent opening in a tank exterior comprising:

a valve seat plate adapted to be mounted across said vent opening on the exterior of said tank, said valve seat plate having a valve seat surrounding a port in fluid communication with said vent opening;

a valve disk having a surface disposed across said valve seat in a closed valve position to block flow through said vent opening, a frame projecting upwardly on the exterior of said valve seat plate mounting said valve disk for guided linear motion toward and away from said valve seat; and a plurality of constant-force springs operably connected between said frame and said valve disk for biasing said disk into a normally closed position against said valve seat;

whereby the valve and its valve operating mechanism are disposed on the exterior of the tank and are thereby protected from contact with the contents of the tank until the valve opens.

* * * * *